(12) United States Patent
Agha Riza

(10) Patent No.: US 6,563,974 B2
(45) Date of Patent: *May 13, 2003

(54) HIGH RESOLUTION FAULT-TOLERANT FIBER-OPTICAL BEAM CONTROL MODULES

(75) Inventor: Nabeel Agha Riza, Orlando, FL (US)

(73) Assignee: Nuonics, Inc., Orlando, FL (US)

( * ) Notice: Subject to any disclaimer, the term of this patent is extended or adjusted under 35 U.S.C. 154(b) by 133 days.

This patent is subject to a terminal disclaimer.

(21) Appl. No.: 09/811,305

(22) Filed: Mar. 16, 2001

(65) Prior Publication Data

US 2003/0059155 A1 Mar. 27, 2003

Related U.S. Application Data

(63) Continuation-in-part of application No. 09/397,822, filed on Sep. 17, 1999, now Pat. No. 6,222,954.

(51) Int. Cl.⁷ .................................................. G02B 6/26
(52) U.S. Cl. ........................... 385/18; 385/147; 385/17; 385/901; 250/330
(58) Field of Search ............................ 385/15–18, 115, 385/147, 901, 20–23; 250/330, 483.1, 484.2, 484.4, 339.05, 341.1, 342.2; 313/483, 498, 505, 510; 345/55, 81, 84; 358/134; 216/24

(56) References Cited

U.S. PATENT DOCUMENTS

| | | | |
|---|---|---|---|
| 4,790,566 A | 12/1988 | Tague et al. | |
| 5,208,880 A | 5/1993 | Riza et al. | |
| 5,312,513 A | 5/1994 | Florence et al. | |
| 5,529,524 A | * 6/1996 | Jones | ........................... 445/24 |
| 5,548,181 A | * 8/1996 | Jones | ........................... 313/309 |
| 5,587,623 A | * 12/1996 | Jones | ........................... 313/309 |
| 5,619,097 A | * 4/1997 | Jones | ........................... 313/309 |
| 5,745,260 A | 4/1998 | Blazey | |
| 5,822,222 A | 10/1998 | Kaplinsky et al. | |
| 5,870,173 A | 2/1999 | Oberhardt et al. | |
| 5,923,036 A | 7/1999 | Tague et al. | |
| 6,028,977 A | * 2/2000 | Newsome | ........................... 250/330 |
| 6,222,954 B1 | * 4/2001 | Riza | ........................... 385/18 |

OTHER PUBLICATIONS

V.Aksyuk, B. Barber, C.R.Giles, R. Ruel, L. Stulz and D. Bishop; Low Insertion Loss Packaged And Fibre Connectorised MEMS Reflective Optical Switch; Electronics Letters, Jul. 9, 1998, vol. 34, No. 14, p. 1413–1414.

B.Barber, C.R. Giles, V. Askyijk, R. Ruel, L. Stulz, and D. Bishop; A Fiber Connectorized MEMS Variable Optical Attenuator; IEEE Photonics Technology Letters, vol. 10, No. 9, Sep., 1998, pp. 1262–1264.

(List continued on next page.)

*Primary Examiner*—Akm E. Ullah
(74) *Attorney, Agent, or Firm*—James H. Beusse; Beusse Brownlee Bowdoin & Wolter, P.A.

(57) ABSTRACT

A high resolution, fault tolerant, variable optical attenuator and polarizer module for fiber optical beam control using parallel, serial, and serial-parallel optical control architectures. The module uses mixed control modes to control a macropixel array and includes spatially multiplexed processing techniques. The macropixel array consists of an array of individually controlled pixels, such as a microelectromechanical system (MEMS) mirror array, where each pixel has a specific addressable location in the array, and each pixel can have a unique size, shape and electrical or optical drive format. The module can provide amplitude, routing, and polarization control of an input optical beam. In an embodiment, the module can control the gain of a light beam in fiber optical systems coupled to lenses. In another embodiment, the modules can be cascaded to form a high-resolution fiber optic attenuator. In yet another embodiment, the modules can be used in 1×N optical switching applications having on demand gain control.

11 Claims, 3 Drawing Sheets

OTHER PUBLICATIONS

Mino F. Dautartas, Albert M. Benzoni, Yang C. Chen, Greg B. Blonder, Bertrand H. Johnson, Carl R. Paola, E. Rice, and Y-H. Wong; A Silicon–Based Moving–Mirror Optical Switch. Journal Of Lightwave Technology, vol. 10. No. 8. Aug. 1992.pp. 1078–1085.

Joseph E. Ford, James A. Walker, Vladimir Aksyuk and David J. Bishop, Wavelength–Selectable Add/Drop With Tilting Micromirrors, IEEE Leos Annual Meeting, Leos 1997. (No date).

L.Y. Lin, E.L. Goldstein, and R.W. Tkach, Free–Space Micromachined Optical Switches With Submillisecond Switching Time For Large–Scale Optical Crossconnects, IEEE Photonics Technology Letters, vol. 10, No. 4, Apr., 1998, pp. 525–527. (No date).

Joseph E. Ford and James A. Walker, Dynamic Spectral Power Equalization UsingMicro–Opto–Mechanics, IEEE Photonics Technology Letters, vol. 10, No. 10, Oct., 1998, pp. 1440–1442. (No date).

Steffen Glockner, Rolf Goring, Torsten Possner, Micro–opto–Mechanical Beam Deflectors, Optical Engineering, vol. 36, No. 5, May 1997, pp. 1339–1345. (No. date).

Nabeel A. Riza and Sarun Sumriddetchkajorn, Digitally Controlled Fault–Tolerant Multiwavelength Programmable Fiber–Optic Attenuator Using A Two–Dimensional Digital Micromirror Device, Optics Letters vol. 24, No. 5, Mar. 1, 1999, pp. 282–284.

Nabeel A. Riza and Sarun Sumriddetchkajorn, Fault–tolerant Polarization–Insensitive Photonic Delay Line Architectures Using Two–Dimensional Digital Micromirror Devices, Optics Communications 160 (1999), pp. 311–320. (No date).

Nabeel A. Riza and Sarun Sumriddetchkajorn, Multiwavelength Three Dimensional 2×2 Fiber–Optic Switch Structure Using Small Tilt Micro–Mirrors, Part of the 18th Congress of the International Commission for Optics: Optics for the Next Millennium, San Francisco, California, Aug. 1999, SPIE, vol. 3749, pp. 470–471. (No date).

Sarun Sumriddetchkajorn and Nabeel A. Riza, Fault–Tolerant Multichannel Programmable Polarization Dependent Loss and Gain Compensator Structures Using Small Tilt Micromirros, 1999 National Fiber Optic Engineers Conference, Chicago, Sep., 1999. (No date).

Nabeel A. Riza, Sarun Sumriddetchkajorn, Versatile Multi–Wavelength Fiber–Optic Switch And Attenuator Structures Using Mirror Manipulations, Optics Communications, 6060 (1999), pp. 1–11. (N0 date).

Nabeel A. Riza and Sarun Sumriddetchkajorn, Small Tilt Micromirror Device–Based Multiwavelength Three Dimensional 2× @ Fiber–Optic Switch Structures, To Be published in the SPIE Journal Optical Engineering, Late 1999/Early 2000 (No date).

Nabeel A. Riza and Sarun Sumriddetchkajorn, Two Dimensional Digital Micromirro Device–Based 2×2 Fiber–Optic Switch Array, IEEE Lasers and Electro–Optics Society, 1998 Annual Meeting, Dec. 1–4,1998, vol. 2; 98CH36243, 1092–8081.

R.L. Knipe, Challenges Of A Digital Micromirror Device: Modeling And Design, SPIE/EOS European Symposium on Lasers, Optics And Vision For Productivity In Manufacturing, Besancon, France (Jun. 10–14, 1996).

Nabeel A. Riza, Coherent Techniques And Digital Micromirror Device Based Switched Photonic Time Delay Control For High–Frequency Antenna Arrays, Proceedings of SPIE, Jul. 30–30, 1997, San Diego, California, vol. 3160.

Nabeel A. Riza and Sarun Sumriddetchkajorn, Fault–tolerant Dense Multiwavelength Add–Drop Filter With A Two–Dimensional Digital Micromirror Device, Applied Optics, vol. 37, No. 27, Sep. 20, 1998, pp. 6355–6361.

* cited by examiner

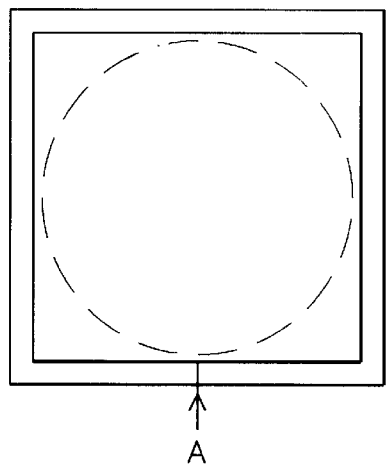
*FIG. 2c*
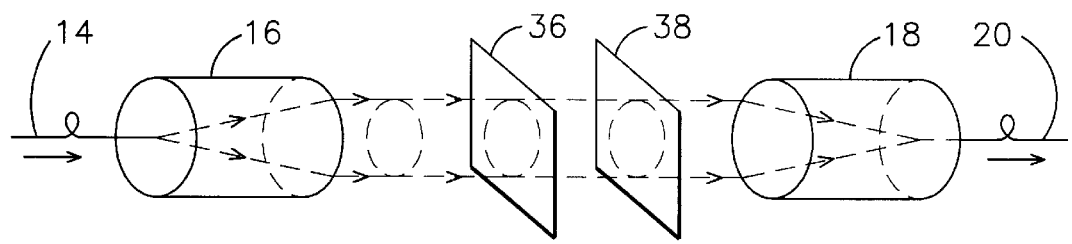
*FIG. 3a*
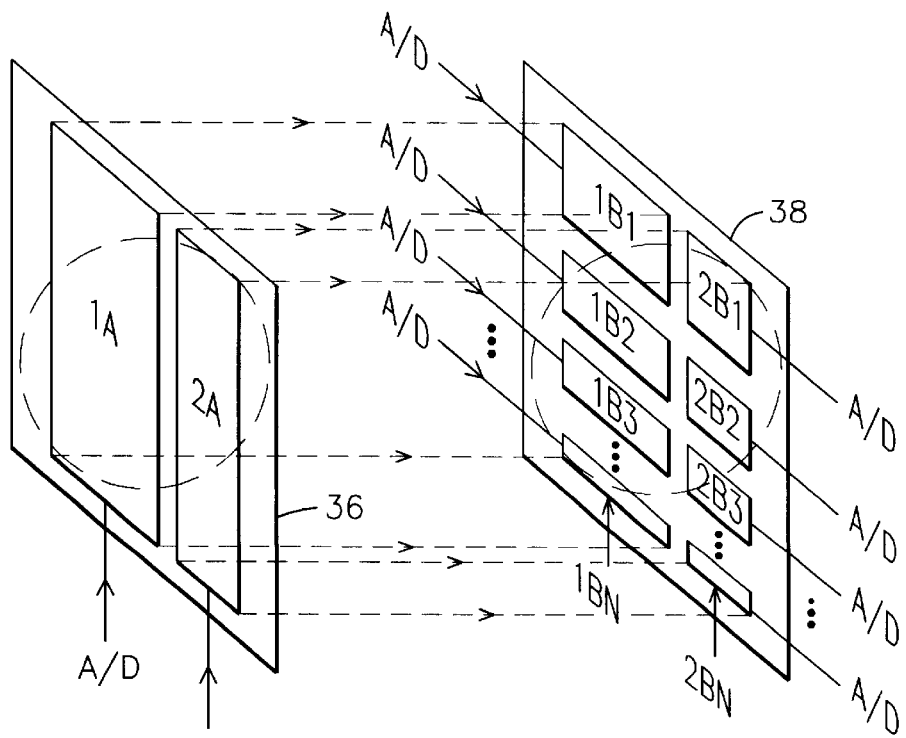
*FIG. 3b*          *FIG. 3c*

HIGH RESOLUTION FAULT-TOLERANT FIBER-OPTICAL BEAM CONTROL MODULES

This application is a continuation-in-part of U.S. application Ser. No. 09/397,822 filed Sep. 17, 1999 now U.S. Pat. No. 6,222,954.

FIELD OF INVENTION

This invention relates to high resolution fiber-optic (FO) beam control modules for gain controls using active mixed-mode SMP macropixel device concept in a parallel, serial, and serial-parallel device placement optical module structure. The basic SMP macro-pixel device is operated in a mixed digital-analog mode combined with a serial and/or parallel placement of other such mixed-mode devices between two fiber collimator lens-fiber ports to form a basic high resolution fiber-optic variable gain control module. Extensions to 1×N switch modules with on demand variable gain controls are achievable with a mixed-mode SMP macropixel device using a dead pixel concept. Applications for such modules include gain, switch, and tap control elements in wavelength division multiplexed (WDM) optical communications, distributed sensor networks, lasers, transmitter modules, receivers, optical switches, crossconnects, WDM programmable add-drop modules, optical amplifier units, gain equalizers, polarization dependent loss (PDL) compensators, polarization mode dispersion (PMD) compensators, various FO monitoring and test equipment, and general photonic signal processing systems.

BACKGROUND OF INVENTION

Optical communication used to provide explosive bandwidth increases using WDM technology. Data rates are expected to increase from 10 Giga bits per second (Gbps) to 40 Gbps and higher per wavelength channel. Plus, wavelengths are expected to increase from 80 wavelengths to 512 wavelength. These straining demands on the optical networks implies stringent accuracy and performance requirements for optical components supporting the network. A critical element of the optical network is the variable optical attenuator (VOA). With increasing bits rates, optical power levels, wavelength channels, spatial channels or routing fibers, the performance requirements for the fiber-optic VOA are driven to demanding numbers. For instance, the next generation VOA will require 60 dB dynamic range, 16-bits of controls, 0.01 dB resolution through full dynamic range, fault-tolerance, ease of controls, low (<1 dB) loss, and moderately fast (in milliseconds) attenuation setting speeds. Today, it is extremely difficult to simultaneously deliver the high dynamic range with high resolution. The present application shows how VOA can provide both the high resolution and high dynamic range using the concept of the mixed-mode SMP macro-pixel-based VOA.

Prior art VOAs employ the interaction of a single fiber-optic beam with a single beam attenuating (reflective, absorptive, deflective, transmissive) element. In other words, any fiber beam globally interacts with one electrically controlled optical beamforming element such as the spatial pixel in two dimensional space or on-axis waveguide element (e.g., thermo-optic element on a section of a silica waveguide). For example, a single predesigned micromirror or polarization altering liquid crystal pixel is optically illuminated by the single beam emanating from an optical fiber. Hence, the entire spatial beam is simultaneously effected by the one optical attenuating response (varying transmittance or reflection) on the pixel. Thus light coupled into the output fiber undergoes an attenuation. If this pixel fails, the VOA completely stops working. This prior art is an example of centralized single-point optical beam processing that is prone to catastrophic component failure. This single pixel (or single point) fiber-optic processing method has been vigorously used to make both optical switching and attenuation FO components, such as using liquid crystals and MEMS based micromirrors. Example of prior art using polarization includes: K. Y. Wu, "Fault tolerant optical routing switch," U.S. Pat. No. 5,724,165, 1998; J. S. Patel and Y. Silberberg, "Frequency selective optical switch employing a frequency dispersive element, polarization dispersive element, and polarization modulating elements," U.S. Pat. No. 5,414,540, May 9; J. S. Patel and Y. Silberberg, "Optical switch employing first and second ferroelectric cells with alignment layers having alignment directions offset by 45 degrees," U.S. Pat. No. 5,414,541, May 9, 1995; K.-Y. Wu and J.-Y. Liu, "1×N digitally programmable optical routing switch," U.S. Pat. No. 5,946,116, Aug. 31, 1999; E. G. Hanson, "Polarization-independent liquid-crystal optical attenuator for fiber-optical applications," *Applied Optics*, 21, 1342(1982) and E. G. Hanson, "Optical switch attenuator," U.S. Pat. No. 4,410,238, Oct. 18, 1983; J. J. Pan, "Polarization independent optical switch/attenuator," U.S. Pat. No. 5,276,747, Jan. 4, 1994 and J. J. Pan, M. Shih, "Optical attenuator with low polarization mode dispersion," U.S. Pat. No. 5,727,109, Mar. 10, 1998, K-Y Wu, J-Y Liu, Y-C Chen, "Optical attenuation using polarization modulation and a feedback controller," U.S. Pat. No. 5,963,291, Oct. 5, 1999; J. L. Wentz, "Polarization independent light modulation means using birefringent crystals," U.S. Pat. No. 3,719,414, Mar. 6, 1973.

Example of prior art using optical MEMS includes: G. A. Magel and T. G. McDonald, "Optical switch using spatial light modulators," U.S. Pat. No. 5,155,778, Oct. 13, 1992; G. A. Magel, "Fiber optic switch with spatial light modulator device," U.S. Pat. No. 5,199,088, Mar. 30, 1993; J. J. Pan, "1×N Electromechanical optical switch," U.S. Pat. No. 5,359,683, Oct. 25, 1994; J. E. Ford, "Fiber optic switching device and method using free space scanning," U.S. Pat. No. 5,621,829, Apr. 15, 1997; V. A. Aksyuk, D. J. Bishop, J. E. Ford, and J. A. Walker, "Freespace optical bypass-exchange switch," U.S. Pat. No. 5,943,454, Aug. 24, 1999; V. A. Aksyuk, D. J. Bishop, and C. Randy, "Micro-machined optical switch with tapered ends," U.S. Pat. No. 6,108,466, Aug. 22, 2000.; J. E. Ford and D. J. DiGiovanni, "1×N Fiber bundle scanning switch," IEEE Photonics Technology Letters, Vol. 10, No. 7, pp. 967–969, July 1998; V. Aksyuk, B. Barder, C. R. Giles, R. Ruel, L. Stulz, and D. Bishop, "Low insertion loss packaged and fibre connectorised MEMS reflective optical switch," Electronics Letters, Vol. 34, No. 14, pp. 1413–1414, July 1998; S. S. Lee, E. Motamedi, and M. C. Wu, "Surface-micromachined free-space fiber optic switches with integrated microactuators for optical fiber communication systems," Transducers '97, pp. 85–87, Chicago, Ill., June 1997; S. S. Lee, L. Y. Lin, and M. C. Wu, "Surface-micromachined free-space fibre-optic switches," Electronics Letters, Vol. 31, No. 17, pp. 1481–1482, August 1995; J. E. Ford and J. A. Walker, "Dynamic spectral power equalization using micro-optomechanics," *IEEE Photonics Technology Letters*, Vol. 10, No. 10, pp. 1440–1442, October, 1998, V. Askyuk, B. Barber, C. R. Giles, R. Ruel, L. Stulz, and D. Bishop, "Low insertion loss packaged and fibre connectorized MEMS reflective optical switch," *IEE Electronics Lett.*, Vol. 34, No. 14, pp. 1413–1414, Jul. 9, 1998, and B. Barber, C. R. Giles, V. Askyuk, R. Ruel, L. Stulz, and D. Bishop, "A fiber connectorized MEMS variable optical attenuator," *IEEE Photon. Technol. Lett.*, Vol. 10, No. 9, pp. 1262–1264, September 1998; V. A. Aksyuk, D. J. Bishop, P. L. Gammel, C. R. Giles, "Article comprising a light actuated microme-chanical photonic switch," U.S. Pat. No. 6,075,239, Jun. 13, 2000; E. E. Bergmann, D. J. Bishop, "Moving mirror switch," U.S. Pat. No. 6,031,946, Feb. 29, 2000; P. Colbourne, J. Obhl, N. Teltelbaum, "Variable optical attenuator," U.S. Pat. No. 5,915,063, Jun. 22, 1999; J. E. Ford, K. W. Goossen, "Level setting optical attenuator," U.S. Pat. No. 5,900,983, May 4, 1999; C. M. Garrett, C Fan, D. Cugalj, D. Gransden, "Voltage controlled attenuator," U.S. Pat. No. 5,745,634, Apr. 28, 1998; J. E. Ford, D. A. B. Miller, M. C. Nuss, J. A. Walker, "Attenuation device for wavelength multiplexed optical fiber communications," U.S. Pat. No. 5,745,271, Apr. 28, 1998; R. Wood, V. Dhuler, E. Hill, "A MEMS variable optical attenuator," 2000 IEEE/LEOS International Conf. on Optical MEMS, pp.121–122, Kauai, Hi., Aug. 21–24, 2000; K. W. Goossen, J. A. Walker, D. T. Neilson, J. E. Ford, W. H. Knox, "Micromechanical gain slope compensator for spectrally linear optical power equalization," IEEE Photonic Technology Letters, Vol.12, No.7, pp.831–833, July 2000; F. Chollet, M. de Labachelerie, H. Fujita, "Compact evanescent optical switch and attenuator with electromechanical actuation, IEEE Journal of Selected Topics in Quantum Electronics, Vol.5, No.1, January/February, 1999; F. Chollet, M. de Labachelerie, H. Fujita, "Electromechanically actuated evanescent optical switch and polarization independent attenuator", Proc. IEEE MEMS Conf., pp.476–481, 1998.

Earlier, space has been exploited for free-space based optical computing systems such as in works of J. L. de Bougrenet de le Tocnaye and J. R. Brocklehurst, "Parallel access read/write memory using an optically addressed ferroelectric spatial light modulator," Applied Optics, Vol.30, No.2, p.179, Jan. 10, 1991; W. Hartmann, "Ferroelectric liquid crystal video display," Proc. Soc. Information Display, Vol.30, pp.99–103, 1989; M. Kimura, et.al., "Electrically and optically controlled gray scale in SSFLCDs," Proc. Soc. Information Display, Vol.31, pp.139–143, 1990.

More recently, for single-mode fiber optics, N. A. Riza has introduced the concept of spatially distributed fiber-optic beam processing using actively controlled pixels called a macropixel. For instance, N. A. Riza suggests active macropixel implementations using MEMS technology based micromirrors and polarization rotators using liquid crystals that interconnect with single mode fiber lenses to realize powerful actively controlled fiber-optic modules and processors. See, for example, applicant's copending U.S. patent application Ser. No. 09/397,822 entitled, "Fault-tolerant fiber-optical beam control modules," filed Sep. 17, 1999, the disclosure of which is hereby incorporated by reference; N. A. Riza and S. Sumriddetchkajorn, "Digitally controlled fault-tolerant multiwavelength programmable fiber-optic attenuator using a two dimensional digital micromirror device," Optics Letters, Vol. 24, No. 5, pp. 282–284, Mar. 1, 1999; N. A. Riza and S. Sumriddetchkajorn, "Small tilt micromirror device-based multiwavelength three-dimensional 2×2 fiber-optic switch structures," Optical Engineering, Vol.39, No.2, pp.379–386, Febuary, 2000; and N. A. Riza and S. Sumriddetchkajorn, "Fault-tolerant dense multiwavelength add-drop filter with a two-dimensional digital micromirror device," Applied Optics, Vol. 37, No. 27, pp. 6355–6361, Sep. 20, 1998. In each of these cited references, each SMP macropixel in a beam controlling device operates in either a digital mode or an analog mode.

Serial cascading of independently controllable VOA elements to add VOA control resolution and dynamic performance has also been proposed earlier such as by N. A. Riza in N. A. Riza, "Advances in three dimensional reversible photonic modules for phased array control," SPIE Conference Proceedings on Photonics and Radio Frequency, Vol.2844, pp.274–283, Aug. 7–8, 1996.

The present invention is the first time a mixed-mode SMP macro-pixel, i.e., a macropixel simultaneously using some digital pixels and some analog pixels within a macropixel are combined with a serial-parallel SMP macropixel device placement architecture sandwiched between two single mode fiber collimator lenses/fibers to form a high resolution and high dynamic range VOA. The one embodiment of the VOA uses a MEMS micromirror-based macropixel, pixels are designed to have their own location, size, shape, and electrical drive format that in turn controls the VOA attenuation dynamic range and resolution. Some pixels in the SMP macropixel have digital tilt states while some pixels work in analog drive mode with various states in a continuous mirror positional setting. This mixed mode SMP MEMS micromirror device is combined with a fiber lens with at least two fibers to form a reflective design VOA. This VOA design can accomplish precision and high dynamic range attenuation-based fiber-optic signal processing. These VOAs can be designed with other macropixel technologies such as polarization rotating liquid crystals, diffraction-based polymer dispersed liquid crystals, holograms in electrically controlled crystals, acousto-optic materials, bubble-based devices, magneto-optic devices, and quantum well devices used for absorption or polarization rotation.

DESCRIPTION OF THE DRAWINGS

FIG. 2(c) illustrates the single pixel analog macropixel device of FIG. 2(a);

FIG. 3(a) shows a high resolution and high dynamic range VOA mixed control mode parallel-serial processing architecture for fiber-optic beam controls using two mixed analog-digital control mode SMP macropixel devices operating in transmission mode in which one device is shown in an exemplary form segmented into two macropixel areas wherein the sum of the two areas equals the incident beam area;

FIG. 3(b) illustrates one form of macropixel used in FIG. 3(a);

FIG. 3(c) illustrates another form of macropixel used in FIG. 3(a);

SUMMARY DESCRIPTION OF THE INVENTION

Figure 1A:
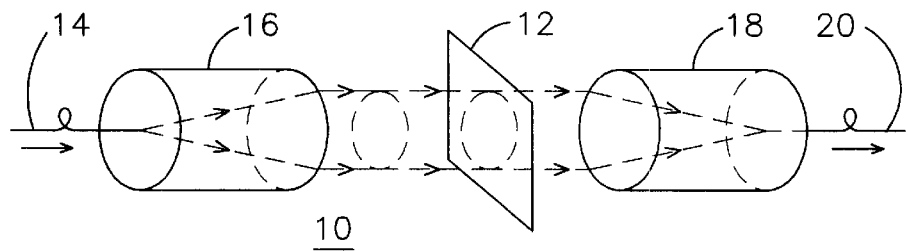
FIG. 1(a) shows a high resolution and high dynamic range VOA mixed control mode parallel processing architecture for fiber-optic beam controls using a mixed analog-digital control mode SMP macropixel device operating in transmission mode.

High resolution fiber-optic attenuation beam control modules of the present invention are based on unique parallel, serial, and serial-parallel optical controls architectures using devices based on a mixed control mode spatially multiplexed processing (SMP) technique using actively controlled macro-pixels. The mixed-mode SMP macro-pixel method involves multiple device pixels per beam where some pixels are controlled in a digital mode and some pixels are controlled in an analog-mode. It is also feasible that under certain attenuation requirement situations, all pixels may be operated in analog mode or all pixels work in digital mode, i.e., working in the extreme cases of the mixed-mode.

The mixed-mode SMP macropixel device consists of an array of individually controlled pixels where each pixel has its specific location, shape, size, and electrical drive signal format. The mixed-mode SMP control method inherently provides a robust and highly accurate technique for amplitude and routing controls of an input optical beam. The preferred embodiment of the mixed-mode SMP macropixel approach is implemented for optical beams being coupled in and out of the versatile beam processing module for gain controls via fiber-optics coupled to fiber lenses. A preferred embodiment of the mixed-mode device consists of micromirrors fabricated via optical microelectromechanical systems (MEMS) technology. In the digital-mode, the micromirror pixel has two positional states such as two tilt states. In the analog-mode, the micromirror pixel has more than two positional states such as N angular tilt or piston motion positional states. Other embodiments of the mixed mode SMP macropixel based VOA includes one using polarization control pixels such as made from liquid crystals. This VOA operates in a serial or serial-parallel architecture, depending on the design of the macro-pixel devices used in the module. The serial cascade of one or more mixed-mode SMP macropixel devices sandwiched between fiber-optics can be used as a high resolution variable fiber-optical attenuator. The SMP devices and pixels can be designed to function in independent roles as coarse and fine power control mechanisms for the light beams.

Pixels in any SMP macro-pixel device can also operate as a dead pixel where any given chosen pixel is not driven during component operations. The dead pixel can also be predesigned into the SMP chip as a pixel area that has a given area with a given transmission or reflection coefficient. These dead pixels are useful when tapping of a given amount of optical power needs to be activated during component operations. In these cases, the proposed component embodiments have more than one output fiber, leading to switching capabilities with built in gain controls for the output ports.

In general, the proposed VOAs and 1×N switches can be designed with other macropixel technologies such as polarization rotating liquid crystals, diffraction-based polymer dispersed liquid crystals, holograms in electrically controlled crystals, acousto-optic materials, bubble-based devices, Faraday rotation magneto-optic devices, photonic bandgap engineered crystals, and quantum well devices used for absorption or polarization rotation.

DETAILED DESCRIPTION OF THE INVENTION

Figure 1B:
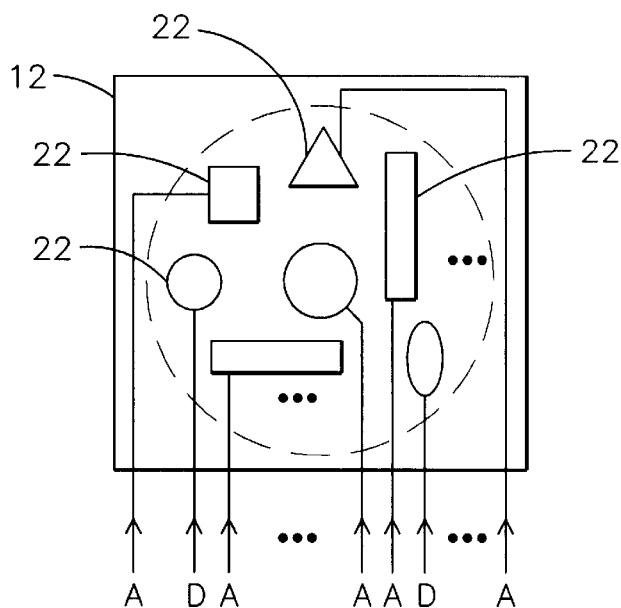
FIG. 1(b) is an enlarged view of the macropixel device of FIG. 1(a)

FIGS. 1(a) and 1(b) show one form of high resolution and high dynamic range VOA module 10 mixed control mode parallel processing architecture for fiber-optic beam controls. The VOA uses a mixed analog-digital control mode SMP macropixel device 12 operating, for example, in a transmission mode. The VOA module 10 is a two fiber port structure, where light coupling from input fiber 14 is implemented via a fiber lens 16 such as a graded-index rod or GRIN lens or a ball lens. The input lens 16 acts to collimate light coming from the input fiber 14 while an output lens 18 focuses light into an output fiber 20. The module in FIG. 1 is reversible.(i.e., light can flow in either direction) as shown by the IN/OUT labels on the fibers 14, 20. Collimated light strikes the mixed-mode SMP macropixel device 12 with N pixels 22 of any desired shape, size, position, and electrical drive format. The total area of all the pixels 22 adds up to equal the area of the incident beam indicated by dotted line 24. The relationship between the relative areas of the pixels can follow any desired allocation based on the fiber-optic component being realized. For instance, the pixel areas can follow a binary relationship where areas increase by a factor of two. Other examples of pixel area design are also possible such as ternary or factor of three designs or non-linear pixel area modulation ratios.

Some pixels in device 12 are chosen to be driven in analog mode while the remaining pixels are driven in digital mode. FIG. 1(b) shows a configuration where certain pixels 22 have analog drive (A) and some have digital drive (D). It is also possible to have dead pixels in the device design, implying that these pixels are not electrically driven or don't change state as rapidly as some of the other pixels. The dead pixel can also imply a chip zone that has a fixed transmission or reflection coefficient and a given desired area. The dead pixel design can be useful when fixed power flow is desired for a given fiber output port. If a pixel has analog drive, it operates through all states between the two extreme digital states of the pixel. In other words, in digital drive for a pixel, in one binary state the pixel has essentially zero attenuation on the incident optical beam and in the other digital state has maximum attenuation on the incident beam. The pixel in the analog state goes through all the attenuation states between the two digital settings. Typically, the digital mode is robust when small repeatable attenuation settings are required. The analog state is useful when setting the overall attenuation position of the VOA. Thus, the mixed mode of operation of the SMP macropixel helps in providing a VOA with both high resolution and high dynamic range. Because all pixels simultaneously act on the incident fiber-optic beam, the architecture is called a parallel processing architecture for the VOA. While FIG. 1(a) shows the parallel processing concept in a transmissive design, a reflective design is possible using a reflective device at 12 or a mirror placed after the transmissive device 12 as will be shown. The macropixel device 12 can be built using any optical technology that provides interaction of light with a planar pixelated surface. Example technologies include polarization rotating liquid crystals, diffraction-based polymer dispersed liquid crystals, holograms in electrically controlled crystals, acousto-optic materials, bubble-based devices, Faraday rotation magneto-optic devices, photonic bandgap engineered crystals, and quantum well devices used for absorption or polarization rotation.

Figure 2B:
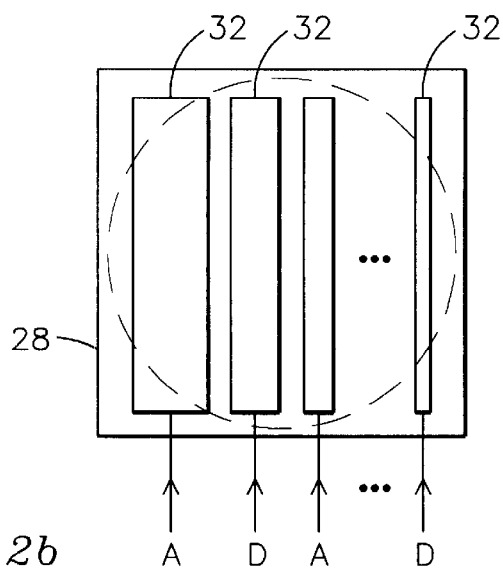
FIG. 2(b) is an enlarged view of the mixed mode macropixel device of FIG. 2(a)

FIG. 2 illustrates a high resolution and high dynamic range VOA 26 employing a mixed control mode with a serial processing architecture for fiber-optic beam controls. The VOA module 26 uses a mixed analog-digital control mode SMP macropixel device 28 operating in transmission mode and another single pixel analog drive mode transmissive device 30. Device 30 acts as a coarse or bias attenuation setting device while Device 28 acts as a fine attenuation tweeker. Device 28 has several pixels 32 of different area values, with each pixel having the option to be driven in either analog (A) or digital (D) mode. As shown, some pixels 32 in Device 28 have digital drive while others have analog drives. In an extreme case for super control, all pixels in Device 28 can be driven in analog mode to eliminate any digital quantization effects on the power attenuation curve of the VOA module 26. On the contrary, pure digital control of the device 28 pixels is all possible as the component application desires. FIG. 2(c) shows the single-pixel analog device 30.

Figure 2A:
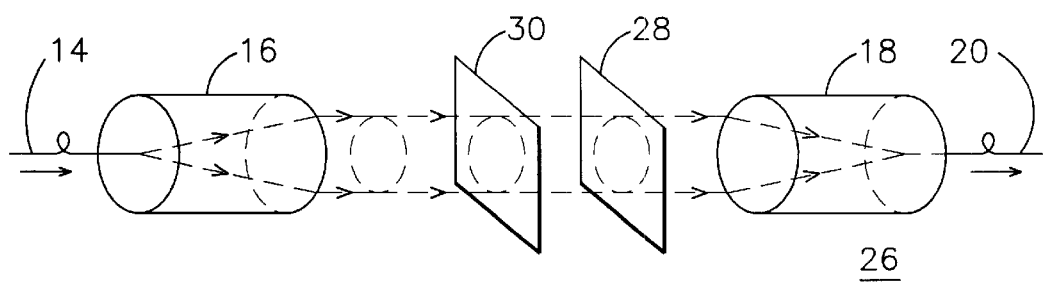
FIG. 2(a) shows a high resolution and high dynamic range VOA mixed control mode serial processing architecture for fiber-optic beam controls using a mixed analog-digital control mode SMP macropixel device operating in transmission mode and another single pixel analog drive mode transmissive device where the single pixel analog device acts as a coarse or bias attenuation setting device while the mixed device acts as a fine attenuation tweeker.

FIG. 3(a) shows an alternate embodiment of the invention that combines parallel and serial optical layout embodiments of FIGS. 1(a) and 2(a) to realize a parallel-serial embodiment, i.e., a high resolution and high dynamic range VOA mixed control mode parallel-serial processing architecture 34 for fiber-optic beam controls. The VOA module 34 uses two mixed analog-digital control mode SMP macropixel devices 36 and 38 operating in transmission mode. Device 36 (FIG. 3(b)) may be segmented into multiple areas such as the two macropixel areas 1A and 2A, where 1A plus 2A add up to equal the incident beam area. The relative area size of the 1A and 2A pixel areas can follow any desired format as required for the component application. The 1A and 2A pixels can have either analog or digital drives, as shown by the A/D notation. Device 38 (FIG. 3(c)) also has two sub-areas where each sub-area has its own array of pixels labeled 1B1, 1B2, 1B3, . . . , 1BN, for the first N-pixel sub-area and similarly 2B1, 2B2, 2B3, . . . ,2BN, for the second N-pixel sub-area. The relative adjacent pixel areas between the two sub-areas can be chosen to follow any desired format. Again, these pixels have the A/D drive option for maximum effectiveness. The first N-pixel subarea in device 38 controls the beam coming from pixel area 1A in Device 36 while the second N-pixel subarea in device 38 controls the beam coming from pixel area 2A in Device 36. As shown, Device 38 has 2N pixels. The FIG. 3(a) embodiment uses Device 38 for coarse attenuation controls while device B is used for fine optical power attenuation controls. Depending on the optical application need, all or some of the pixels are activated to deliver the desired VOA response. This supreme flexibility in drive type, pixel size and position, and optical component architecture realizes a powerful VOA with extraordinary features. Also note that the VOA module of FIG. 3(a) is reversible.

Figure 4A:
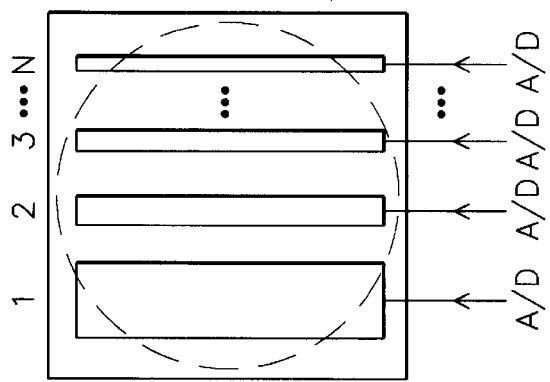
FIG. 4(a) illustrates an embodiment of the high resolution and high dynamic range VOA based on micromirror of MEMS based device and the parallel beamforming architecture in which the reflective architecture consists of two fibers connected to a single fiber collimator lens via a mixed-mode SMP Macropixel Device using small tilt micromirrors to deliver the desired optical power attenuation level
Figure 4B:
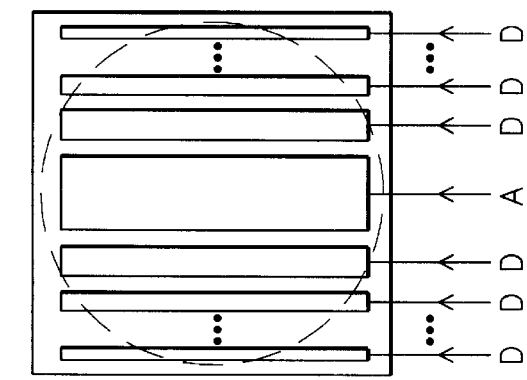
FIG. 4(b) illustrates an N micromirror device where a central larger micromirror operates in a continuous analog mode while the remaining micromirrors operate in a digital mode and wherein the micromirrors operate in either a first mode in which small tilt displacement along the x or y direction causes output beam deflection and prevents coupling into the output fiber in which the micromirrors can operate either in a continuous analog mode or a two tilt state digital mode.
Figure 4C:
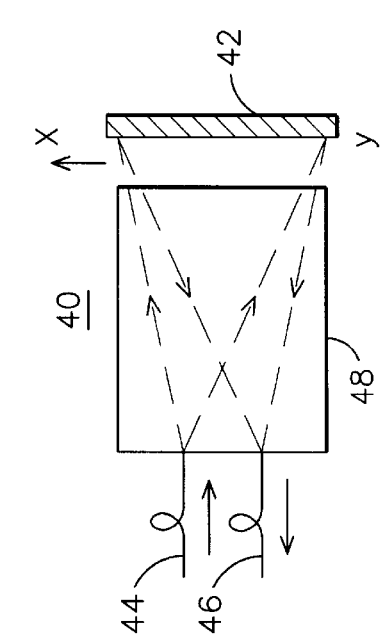
FIG. 4(c) illustrates a second macropixel arrangement.

FIG. 4(a) shows another embodiment of a high resolution and high dynamic range VOA module 40 based on a micromirror of MEMS based device 42 and the parallel beamforming architecture. The FIG. 4(a) design is a reflective mode embodiment of the FIG. 1(a) transmissive design. The module 40 in FIG. 4(a) uses a reflective architecture having two fibers 44, 46 connected to a single fiber collimator lens 48 via the mixed-mode SMP Macropixel Device 42 using small tilt micromirrors. Small tilt here implies fewer than about ten degrees mirror tilt angle. In practice, because commercial dual fiber collimators have short (e.g., 125 micron) distances between the two fibers at the fiber lens 48, much smaller tilt angles such as about three degrees can implement the VOA operation. The dashed lines represents the incident optical beam of area A and the reflected optical beam of a desired area that enters the output fiber 46 to deliver the desired optical power attenuation level. FIG. 4(b) shows 42 as an N micromirror device where the central larger micromirror operates in a continuous analog mode while the other N−1 micromirrors operate in a digital mode. These micromirrors operate in small tilt displacement modes along the x or y direction to cause output beam deflection, hence preventing coupling into the output fiber. FIG. 4(c) shows Device 42 as an N micromirror device where all N micromirrors can operate either in a continuous analog mode or a two tilt state digital mode giving full VOA operational flexibility. Although two fibers 44, 46 are shown in FIG. 4(a), other fibers can be added to the design to realize multi-output port light switches with built-in gain controls. For instance, if three fibers are used, the third fiber can act as a second output port such as used for tapping power when required during monitoring applications. In this case, the two tilt states of the micromirrors correspond to the two output fiber ports. The dead pixel concept continues to play a role here when a fixed power flow needs to be turned on for a given port such as during network performance monitoring. The area of the dead pixel versus the active pixels controls the power division between fiber ports when the pixels are activated for implementing the required tapping operations. Also, the number of pixels can be designed for any number from one to N, giving total flexibility in optical power controls for the user.

Figure 5:
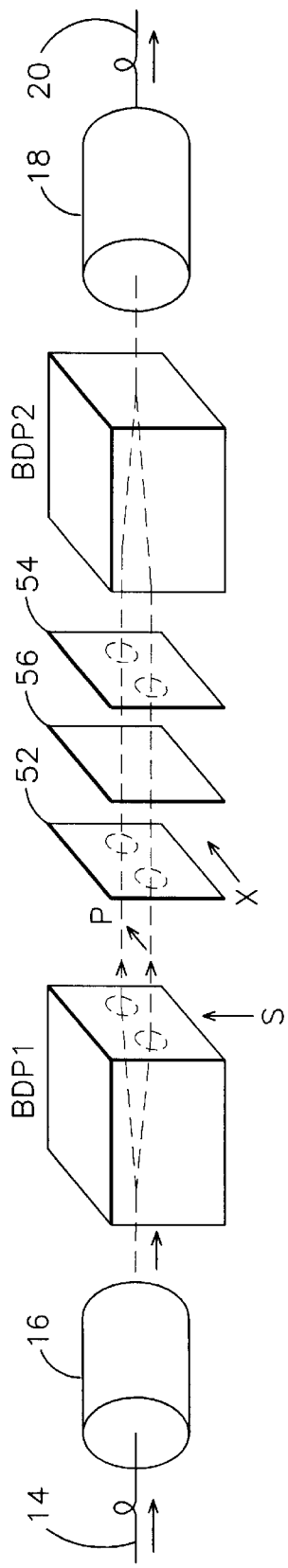
FIG. 5 shows another embodiment of high resolution and high dynamic range VOA using polarization rotation technology based mixed-mode SMP macropixel devices with serial processing and parallel-serial beamforming architectures.

FIG. 5 is another embodiment of a high resolution and high dynamic range VOA module 50 using polarization rotation technology based mixed-mode SMP macropixel devices 52, 54 with serial processing and parallel-serial beamforming architectures. Macropixel Device 52 may comprise two of the pixel devices such as sown in FIG. 2(c) or two pixel areas such as in the device 36 of FIG. 3(b). Also, here Device 54 may use two devices 28 of FIG. 2(b) or be formed such as shown for device 38 of FIG. 3(c). Both devices 52, 54 are polarization sensitive devices such as electrically controlled 90 degree linear polarization rotation devices such as liquid crystal devices. Note that polarization beam displacing prisms BDP1 and BDP2 are used for splitting and combining the light linear polarizations to implement the well known polarization diversity-based processing for light from fiber-optics. Again, the FIG. 5 design is reversible in nature. The polarizer 56 between the devices 52 and 54 is used for attenuating light between the two stages of the polarization processing. Recall that the pixels in the devices 52 and 54 can have any number, shape, position, size, and drive, to give full flexibility to this VOA. For example, in one embodiment of FIG. 5 design, device 52 can be a 2-pixel analog drive liquid crystal device while device 54 can be a 2N pixel digital drive liquid crystal device. Although two fiber ports are shown in FIG. 5, extensions to additional output fiber ports is possible to give additional routing controls with built-in gain controls. In addition, the dead pixel concept can also be employed to yield fixed power flow at a desired port when this port is activated by controlling the appropriate pixel.

What is claimed is:

1. A macro-pixel operable in a mixed mode control technique, the macropixel having a plurality of controllable pixel devices, each of the pixel devices addressable by at least one of a digital and analog signals to cause the addressed pixel device to be individually controllable in selected positions between a fully off position and a fully on position.

2. The macropixel of claim 1 wherein the devices are selected from the group comprising micromirrors (or optical MEMS), liquid crystals, gratings in electro-optic, acousto-optic, and polymer materials such as polymer dispersed liquid crystals, bubbles, thermo-optic materials, and multiple quantum well materials.

3. The macropixel of claim 1 wherein the devices have thin film, bulk, or a combination of thin film and bulk.

4. The macropixel of claim 1 wherein some pixel devices in the macropixel operate in a digital mode while other pixel devices in the macropixel operate in a digital two state mode.

5. The macropixel of claim 1 further comprising combined simultaneous analog and digital operation in which a pixel device is first biased to a desired position using analog control and the pixel device is operated in digital mode from that biased state.

6. An optical micromechanical system for controlling reflectivity of a light beam from an optical source, the system including a macropixel comprising a plurality of individual micromirrors which are closely spaced with respect to the wavelength of the light beam, each of the micromirrors being electronically controllable to effect a mechanical movement, the macropixel being operable in a first mode for concurrently maintaining an alignment of the micromirrors at a common displacement for maximizing reflection of the light beam in a selected path, the macropixel being operable in a second mode for aligning some of the micromirrors in a different displacement so as to effectively attenuate the reflected light beam, the displacement of the micromirrors comprising an angular tilt of each micromirror; and a bi-directional light transfer device positioned for transmitting a light beam onto said macropixel and for receiving a light beam reflected from said macropixel, said micromirrors being individually angularly controllable to adjust the intensity of the light reflected back to said transfer device; and said bi-directional light transfer device including a fiber lens and at least two fiber-optical cables coupled to one side of said fiber lens.

7. The optical micromechanical system of claim 6 wherein said fiber-optic cables includes one fiber cable to transfer light into the optical mechanical system and at least one fiber optical cable to receive light after reflection or redirection from the macropixel device.

8. The optical micromechanical system of claim 6 wherein said fiber lens comprises a GRIN lens.

9. A polarization based system for controlling transmissivity of a light beam from an said optical source, the system including a macropixel comprising a plurality of individually electronically controlled liquid crystal pixels that effect the transmission and polarization of the incident beam that is received by an optical receiver.

10. The polarization based system of claim 9, where both the source and receiver are coupled with beam displacing and combining polarization optics to implement polarization diversity-based optical beam processing.

11. The polarization based system of claim 10 wherein said combining polarization optics comprises a beam displacing prism.

* * * * *

UNITED STATES PATENT AND TRADEMARK OFFICE
CERTIFICATE OF CORRECTION

PATENT NO. : 6,563,974 B2  Page 1 of 1
APPLICATION NO. : 09/811305
DATED : May 13, 2003
INVENTOR(S) : Nabeel Agha Riza It is certified that error appears in the above-identified patent and that said Letters Patent is hereby corrected as shown below:

On the Title Page, Item (54) should read

-- High Resolution Fault-tolerant module for Fiber-Optical Beam Control using mixed control modes for driving macropixels. --

Signed and Sealed this

Eighteenth Day of November, 2008

JON W. DUDAS
*Director of the United States Patent and Trademark Office*

UNITED STATES PATENT AND TRADEMARK OFFICE
CERTIFICATE OF CORRECTION

PATENT NO. : 6,563,974 B2  Page 1 of 1
APPLICATION NO. : 09/811305
DATED : May 13, 2003
INVENTOR(S) : Nabeel Agha Riza It is certified that error appears in the above-identified patent and that said Letters Patent is hereby corrected as shown below:

On the Title Page, Item (54) and Column 1, lines 1-3, should read

-- High Resolution Fault-tolerant module for Fiber-Optical Beam Control using mixed control modes for driving macropixels. --

This certificate supersedes the Certificate of Correction issued November 18, 2008.

Signed and Sealed this

Sixteenth Day of December, 2008

JON W. DUDAS
*Director of the United States Patent and Trademark Office*